FLEXIBLE CONTAINER AND FITTINGS

Filed March 4, 1952 6 Sheets-Sheet 1

INVENTORS
DONALD W. DRYG
LEROY JAMISON
JOSEPH J. VONEDESKUTY
BY William C. Stueber ATTORNEY

INVENTORS
DONALD W. DRYG
LEROY JAMISON
JOSEPH J. VONEDESKUTY

BY William C. Stueber ATTORNEY

FLEXIBLE CONTAINER AND FITTINGS

INVENTORS
DONALD W. DRYG
LEROY JAMISON
JOSEPH J. VON EDESKUTY

BY William C Stuebe ATTORNEY

INVENTORS
DONALD W. DRYG
LEROY JAMISON
JOSEPH J. VONEDESKUTY
BY William C. Slueber ATTORNEY INVENTORS
DONALD W. DRYG
LEROY JAMISON
JOSEPH J. VONEDESKUTY
BY William C Stueber ATTORNEY June 26, 1956 D. W. DRYG ET AL 2,751,954

FLEXIBLE CONTAINER AND FITTINGS

Filed March 4, 1952 6 Sheets-Sheet 6

INVENTORS
DONALD W. DRYG
LEROY JAMISON
JOSEPH J. VONEDESKUTY

BY William C. Stueber ATTORNEY 2,751,954
Patented June 26, 1956

2,751,954

FLEXIBLE CONTAINER AND FITTINGS

Donald W. Dryg, Le Roy Jamison, and Joseph J. von Edeskuty, Minneapolis, Minn., assignors to General Mills, Inc., a corporation of Delaware Application March 4, 1952, Serial No. 274,732

10 Claims. (Cl. 150—1)

This invention relates to flexible containers and the fittings therefor and more particularly to a container formed of a tough durable material, such as rubber having cords embedded therein, and the provsion of attached fittings which make it possible to fill, transport and empty large and heavy containers.

Flexible containers have heretofore been formed of durable and extremely tough flexible materials, such as rubber having strengthening cords embedded therein. Containers formed of these materials are relatively inexpensive considering their long wearing properties, and are not subject to rust and corrosion. Rubber containers are light in weight and can be fully collapsed to a small size for transporting when empty. Such containers may be readily used for foodstuffs as they can be of air-tight construction and give complete protection to the contents.

For handling and transporting material in containers, it is usually desirable that the containers be made in very large sizes, both from the standpoint of economy of the container and for speed in handling the large quantities.

Obstacles are encountered when containers of the flexible type get to be very large in size because of the difficulties of grasping, lifting and supporting a very heavy and bulky container. These containers, formed of rubber although very tough and durable, are not rigid and a force applied at any one location will cause deformation of shape.

It is impractical to handle the container by conventional means. When resting on a firm support, the container is flattened to the conformation of the support and it is extremely difficult to force the tines of a fork truck beneath and it may result in tearing the container material. Slings and grapples deform the shape of the container and it is hard to control the container position while transporting and when setting down. To attempt to lift the container by the cover overstresses the material at a localized point and usually results in tearing the cover from the container top.

An important object of the invention is therefore to provide a container structure and fittings which will permit the design of very large containers and yet enable easy handling without deforming the container shape or tearing the material and yet obtain complete control of the container position at all times so that the container may be quickly transported, filled or emptied, while being supported.

Another object of the invention is to provide hardware for a flexible container which will permit it to be readily filled or emptied and which will permit the use of pneumatic pressures for emptying and for collapsing the emptied container.

Another object of the invention is to provide a method of securely attaching a large annular ring to the surface of a flexible container which has only a small opening to the container interior.

A still further object of the invention is to provide a method of cutting holes in a container made of flexible material impervious to air which enables using conventional types of hole cutters without demaging the opposing walls of the container.

Further objects and advantages will become apparent from the following specification taken in connection with the accompanying drawings, in which.

The container shown, illustrating the preferred embodiment of the invention, is formed of a tough material, such as rubber or synthetic rubber, with cords embedded therein. The material used should be extremely tough and durable and yet be flexible. Material, such as corded rubber, is able to withstand scuffing and blows, and the containers will wear for many years.

Figure 1:
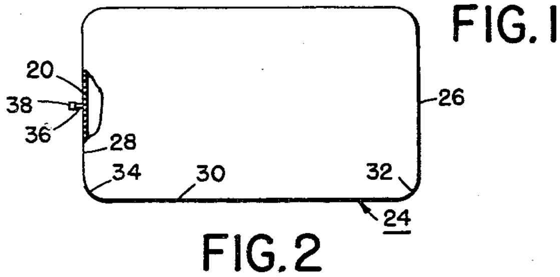
Figure 1 is a front elevation illustrating the container before the fittings are attached.
Figure 3:
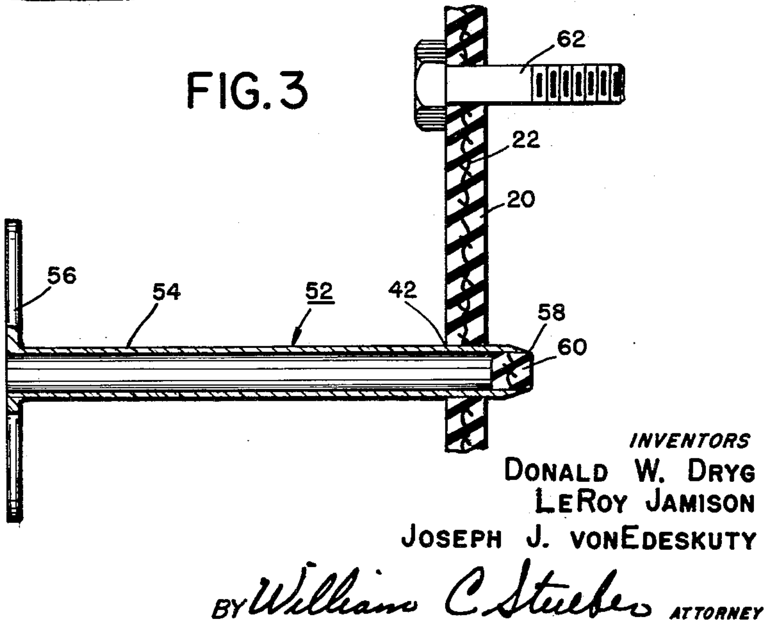
Fig. 3 is a sectional view taken along line 3—3 of Fig. 2 and illustrating the punching of holes in the container end.

The material 20, as shown in Figs. 1 and 3, has a sectional construction similar to automobile tire material, having cords 22 embedded therein, the material being of as many plies as is desirable for toughness, with 4-ply material being satisfactory for very large containers.

The container 24, shown in Fig. 1, may take various shapes but is preferably cylindrical in shape with flattened opposed ends 26 and 28 which are joined to the cylindrical body 30 by rounded shoulders 32 and 34. The cylindrical body may be regarded as directly joining the ends if the shoulders are considered as a part and continuation of the side walls. The container or barrel 24, being cylindrical in shape is economical from a material standpoint, is relatively easy to manufacture on a mold, and its cylindrical shape makes it adaptable to being rolled on its side.

The cylindrical container may be made of any suitable size but it will be readily realized that, from the standpoint of economy of container material and from the standpoint of handling the greatest amount of contents per unit of time, it is desirable to make this container as large as can be conveniently handled by existing machinery and stored and transported in existing equipment. Containers of the size that are capable of handling in the neighborhood of several thousand pounds of wheat flour have proven to be ideal for handling and for storage in freight cars. The container is primarily designed for dry, granular or pulverulent material, such as flour, grains, or sugar, but it is readily usable with many other types and forms of material.

The container, having been formed by a suitable method, first takes the form shown in Fig. 1 and is preferably comprised of continuous seamless material with the only opening to the container being an air valve 36 molded into the center of the top end wall 28. The air valve 36 is a well known type check valve permitting inflation of the container with a pressure hose and preventing escape of the air through the valve. A cap 38 is normally turned over the end of the valve.

To adapt the container so that it will be ready for use as a bin for storing and transporting commodities, certain fittings or hardware items are attached. For securing these fittings to the container, surface holes are cut through the material through which bolts will later extend when the fittings are assembled on the container.

Figure 2:
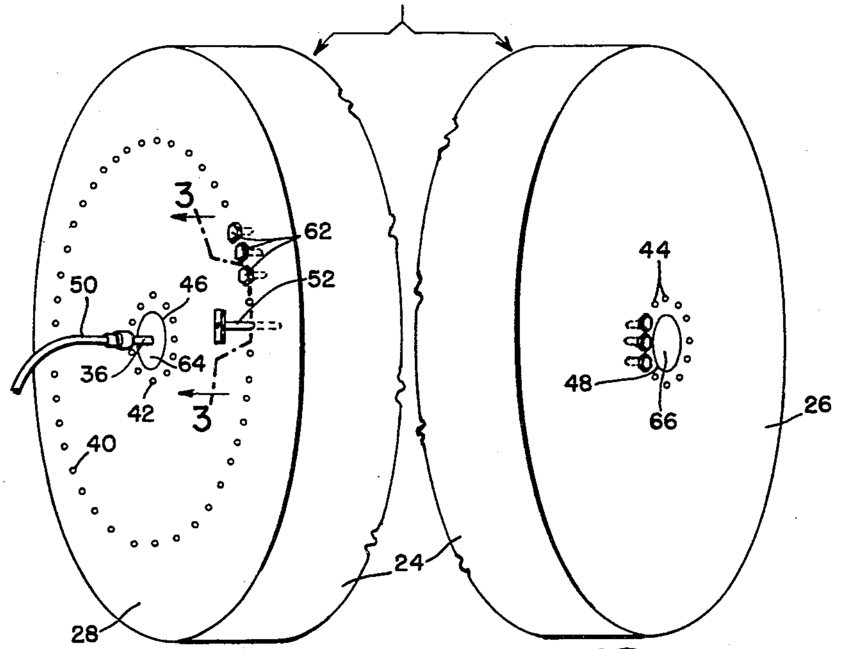
Fig. 2 is a perspective view showing the top and bottom ends of the container with the pattern for the holes marked on the ends.

The position of the holes is located by setting a template or pattern over the ends of the container and marking their locations. The illustrations of Fig. 2, show the upper end 28 and lower end 26 of the container having been marked with hole locations, indicated at 40 and 42 on the upper end and at 44 on the lower end. These hole locations are located with respect to the axial center of the container, which is represented by the valve stem 36 on the upper end, and the holes are concentrically arranged around the center at both ends. The circles 46 on the upper end 48 and on the lower end indicate the lines which the knife will follow when cutting the access openings for the container. The small holes, however, are the first to be formed.

The container is fully inflated before cutting. In order to keep the opposing upper and lower ends 28 and 26 spaced fully apart and prevent the side wall 30 of the container from doubling up against the ends so when the sharp punch is forced through the ends to cut the holes it will not cut the other material. Inflation will also draw the material of the container taut, giving the container a rigidity which greatly assists in punching the holes in the surface. The container is inflated through an air line 50 attached to the valve stem 36 by a suitable fitting which is secured on the end. Air is fed into the container through the line from a suitable pressure tank, not shown, to which the airline 50 is attached. When the container is quite rigidly inflated, a cutter, illustrated by a punch 52, is applied to the material.

Although any suitable type of hole cutter may be used, a punch is shown in detail in Fig. 3, consisting of a hollow tube 54 with a cross-handle 56 secured to one end of the tube. The other end is provided with a sharp edge 58 which forms the cutting end. A hole is punched in the container material in a well known manner by forcing the sharp cutting edge 58 against the material and simultaneously pressing and rotating the handle 56. A hole will be formed in the material 20 and the punch will remove the round plug of material 60 which seats itself within the cylindrical interior of the tubular punch.

The punch is then withdrawn, leaving a hole in the material. The hole is quickly plugged to prevent the escape of air. The plug which is used, as is shown in Fig. 3, is a bolt 62, which is to be later used for attaching the fittings. Other types of plugs may be used although the bolts exactly fit the holes and may be turned in if the fit is snug. As soon as each succeeding hole is cut an additional bolt is used to close the hole, thereby preventing the escape of air from inside the container and keeping the container taut. As will be noted from Fig. 2, the airline 50 is kept attached to the valve stem to maintain the pressure inside the container and to replace air which may escape. The pressure within the container need not be great, but only sufficient to fill out the container and hold the surface taut.

The procedure above described for punching holes is followed for both ends, cutting the holes illustrated at 40, 42 and 44. The plugs 62 are left in the holes in the end while cutting the holes in the opposite end.

Figures 4, 5, 6, 7, 8:
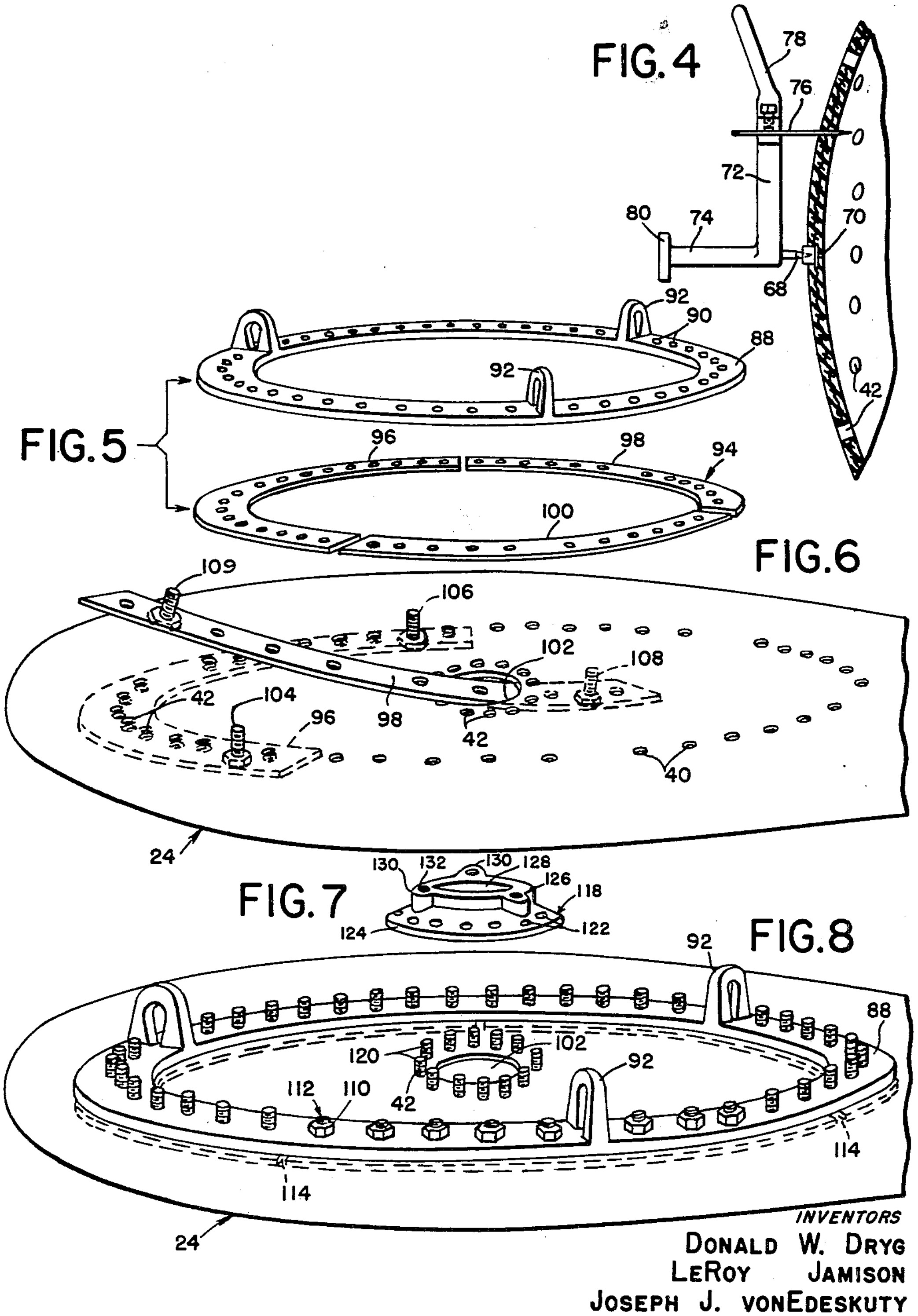
Fig. 4 is a sectional view taken through the center of the container end and illustrating cutting an opening for the cover fitting.
Fig. 5 is a perspective view illustrating the annular container supporting ring and the cooperating backing ring.
Fig. 6 is a perspective view of the container end illustrating the method of placing the backing ring sections within the container.
Fig. 7 is a perspective view of the cover fitting.
Fig. 8 is a perspective view of the top end of the container with the supporting ring in position for attaching.

When the holes have been completed, access openings are cut at each end by the method illustrated in Fig. 4. The knife for cutting the container to form the access openings follows the circular lines 46 at the top end and at 48 at the lower end, thus removing the areas of container material indicated at 64 on the upper end and 66 at the lower end. Since these areas are fairly large and permit rapid escapement of air, the cutting is not done with pressure in the container and the bolts 62 may be removed from the holes.

The cutter used for forming the excess holes may be of any type and the knife shown is for purposes of illustration only. The cutter swings about a pivot point 68 which is set in the center of the circle to be cut, which in the top end of the container is the valve hole 70, the valve stem first being removed. At the lower end the cutter assembly has the pivot point 68 which is sharp so that it may be punched into the rubber container material. The cutter has a beam 72 extending out from a central shank 74, the beam carrying a sharp-edged knife 76 and having an extension handle 78 for manually drawing the knife through the container material. The shank 74 has an enlarged end 80 for steadying the cutter, as it is rotated by drawing the knife circularly around the pivot point 68.

When this procedure has been followed at both ends, the container will have circular disks removed from the center of the top and bottom ends. These access openings will be fitted with appropriate hardware to be later described.

Figure 15:
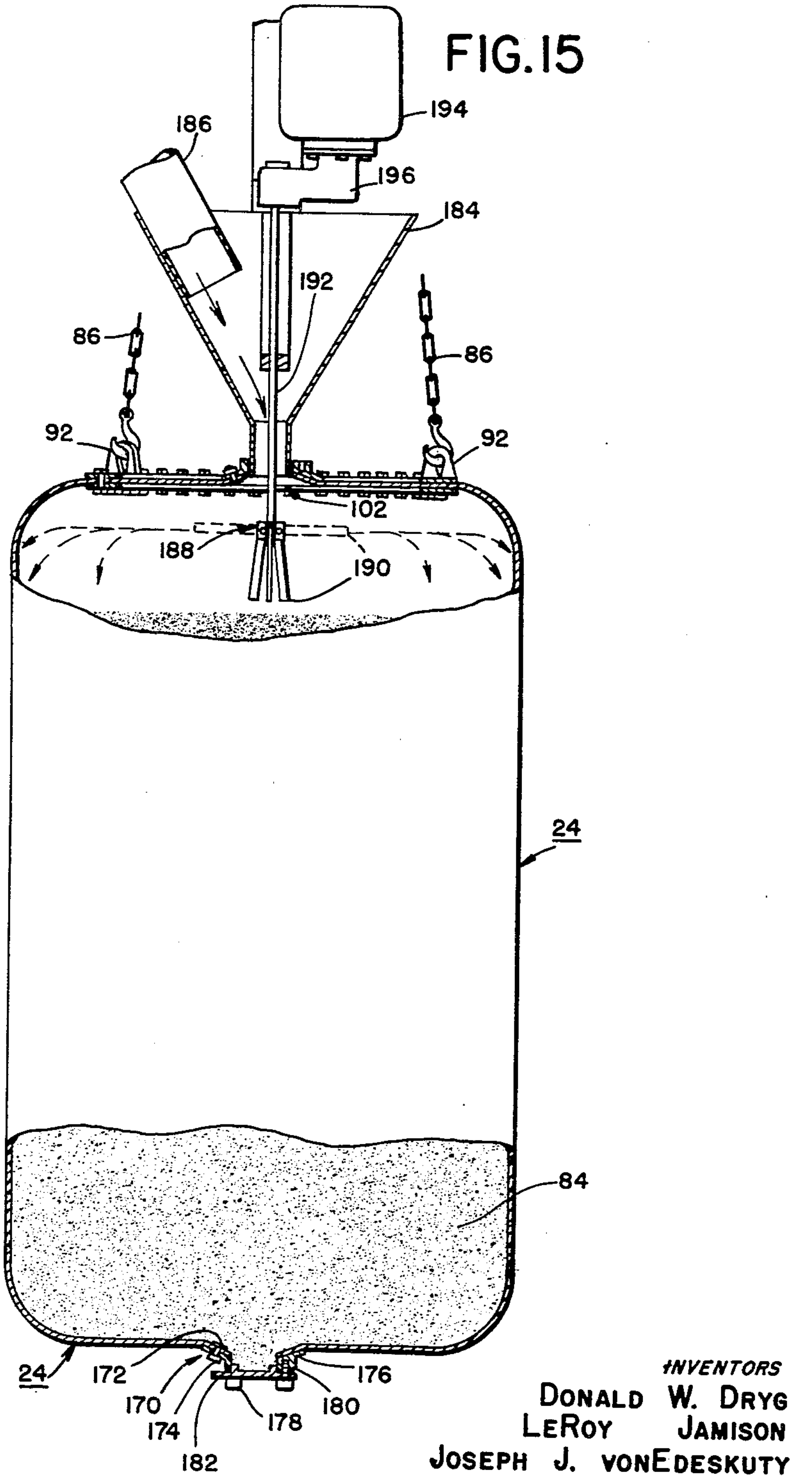
Fig. 15 is a front elevation illustrating the completed container being supported during filling.
Figures 16, 17:
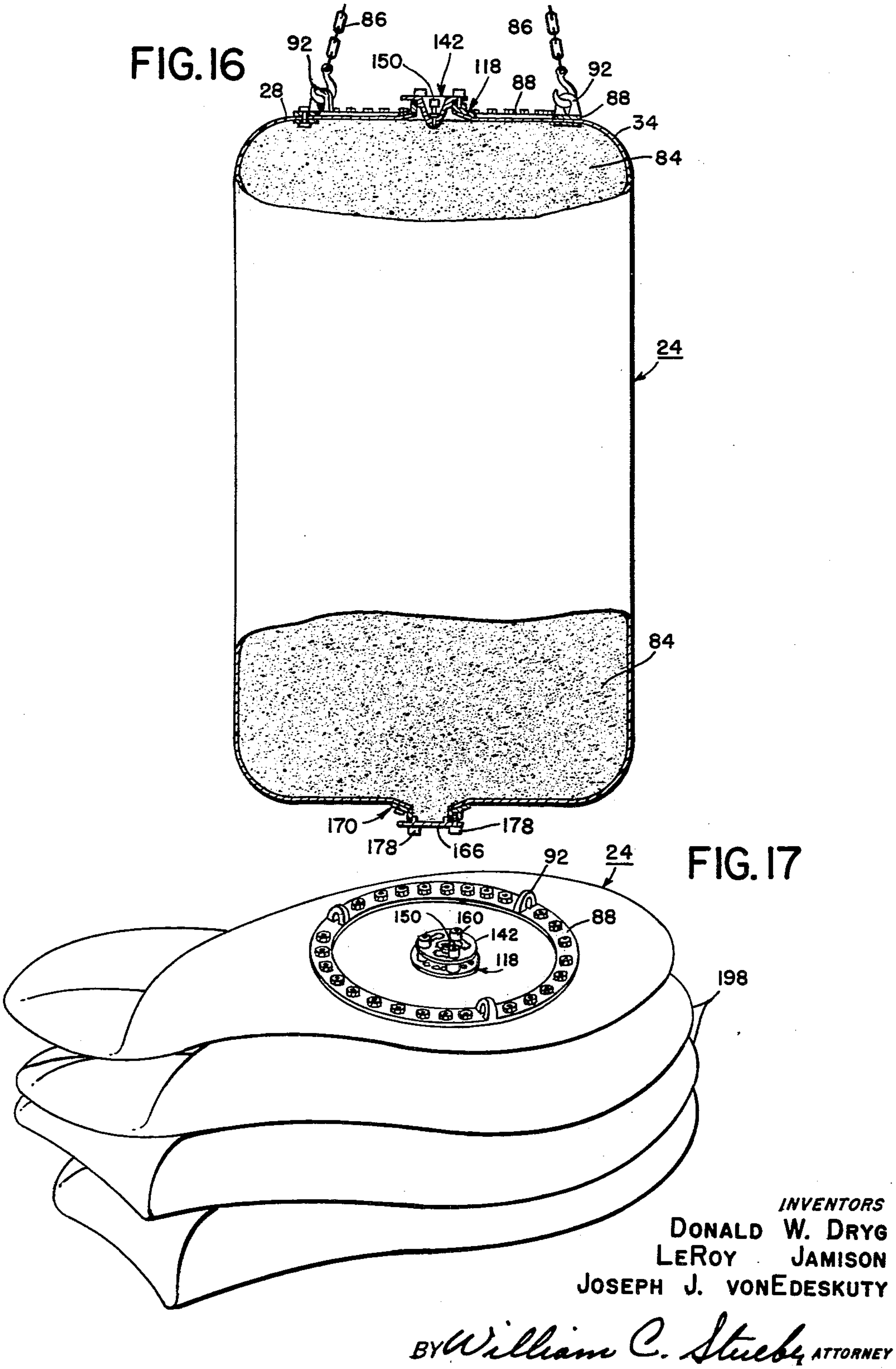
Fig. 16 is a front elevation, partially in section, illustrating the completed container being transported by means attached to the supporting ring.
Fig. 17 is a perspective view illustrating a group of containers collapsed and stacked.

The completed container with the fittings or hardware attached is shown in Figs. 15 and 16. Fig. 16 shows the container 24 having been filled with contents 84 and shows the container supported for transportation by chains 86. The container embodying the features of the present invention may be of any size and is shown constructed of a size that will contain several thousand pounds of material. The container, being formed of tough corded rubber, will readily submit to the stresses of the contents without bursting or splitting. For purposes of handling, a container of this size presents a bulky, unwieldy object which must be handled by power machinery, but which cannot be readily grasped by any conventional method without causing severe localized strains in the material which may result in tearing. To provide a device for supporting the filled container, which will distribute stress over a substantial area so as to keep stresses considerably below the unit tearing stress, an annular continuous metal load-supporting or lifting ring 88 is secured to the container surface at one end. The ring has a large diameter so that it will fit around the outer edge of the upper end 28 of the container, just inside the shoulder 34 where the top end and shoulder join. Thus the ring forms a continuous supporting beam and the weight of the container and its contents are distributed over the entire circumferential length of the beam or ring. When the container is lifted, the container keeps its shape, the supporting lift being transmitted through the curved shoulders of the container.

The ring is shown in detail in Fig. 5, being provided with a series of holes 90 through which bolts will extend. Eyes 92, each formed of a projecting loop of metal with an opening therethrough, are suitably provided on the ring. Any number of eyes may be used and the three, used with the preferred embodiment, are sufficiently strong to support the heavy container. The eyes, being equispaced along the ring, will hold the container in a vertical position.

Though the ring may be secured to the container by various means, the preferred mechanism is a backing member or ring 94 of the same size positioned opposite the supporting ring on the inner side of the end wall.

Because of the intricate vulcanizing process which must be performed to construct the rubber container, it is much more convenient to attach all the hardware after the rubber container 24 has been manufactured. In this way, the barrel or container can be processed and made at the rubber plant and the air evacuated from the inside to flatten the barrel into a small space for shipment. The hardware can then be attached at the location where the barrel is to be used.

The backing ring 94 must be attached inside the barrel which means the ring must be gotten inside the container. For this purpose, the backing ring 94 is split into the segments 96, 98 and 100. The segments can be easily inserted into the barrel by passing them through the access opening 102, as is shown in Fig. 6. The segment 96, shown in position within the barrel, has had hexagonal headed bolts 104 and 106 inserted through holes in the ends and the segment has been passed inside the barrel through the opening 102 and positioned in the location shown. By reaching in through the hole 102, the individual who does the assembling matches the bolts in the arcuate backing ring segment 96 with the holes 42 in the container and then pushes the bolts 104 and 106 into the holes. Since the bolts will fit snugly in the rubber container material, the bolts will hold the ring segment in place. The next ring segment 98 is inserted within the barrel in a similar manner, having bolts 108 and 109 placed in holes in the end and the segment passed through the opening 102 and positioned within the barrel.

When the three ring segments are in place, the remaining bolts are passed through the remaining holes. The upper lifting ring 88 is then placed over the bolts. The ring is secured in place by nuts 110 threaded onto the bolts, the remaining bolts being indicated generally by the number 112.

The lower ring 94 may be split into any number of segments, although it is preferred to have the same number of segments as the load-supporting ring 88 has lifting eyelets 92. The load supporting ring is positioned so that the gaps 114 between the backing ring segments will be located between the eyelets 92.

Figure 11:
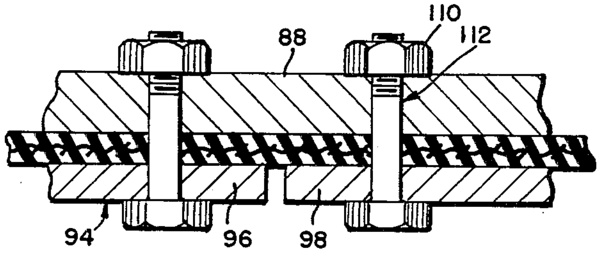
Fig. 11 is an enlarged view with a portion broken away illustrating the relative positions of the supporting ring and the separation between the sections of the backing ring.

When the load supporting ring is in position, the nuts 110 are turned down tightly to draw the backing ring segments and the lifting ring tightly together, with the rubber container material therebetween. The relative positions of the outer load-supporting ring 88 and the inner backing ring 94 are shown in the sectional view of Fig. 10. The gap between the backing ring segments, which occurs intermediate the eyelets 92 on the load supporting ring is shown in Fig. 11.

The heads 116 of the bolts 112 fit snugly against the ring 94 providing no crevices in which matter could collect and contaminate the contents.

To accommodate a cover for the opening 102, a cover fitting 118 is attached to the container. The cover fitting is shown in detail in Figs. 7 and 12. To attach the fitting, bolts 120 are inserted from the inside of the container, out through the holes 42 arranged around the opening. The cover fitting 118 is placed over the opening so that the bolts 120 will pass through the holes 122 in the flange 124 of the fitting.

The fitting includes an annular-shaped collar 126 with an opening 128 through the center, the flange 124 being secured to the lower edge of the collar 126. Three bosses 130 are evenly spaced around the edge of the collar and have vertical threaded holes 132 therein for purposes of attaching a cover plate, which will later be described.

When the cover 118 has been placed over the bolts, so as to be centrally located with respect to the hole 102, nuts 134 are threaded to each of the bolts to secure the cover fitting in place. The bolts have enlarged flattened heads 136 which are sufficiently broad to be tangential with each other in order to include the greatest amount of the rubber container material and draw it against the lower face of the cover flange 124. The lower face of the flange is tapered downwardly away from the center opening so that, when the nuts 134 are tightened, the container material around the opening will be drawn upwardly away from the contents of the container. The outer edge 138 of the flange 124 is rounded, as indicated in Fig. 14, so as to avoid damaging the container material 20 when it is drawn tight to the fitting.

Figures 9, 10:
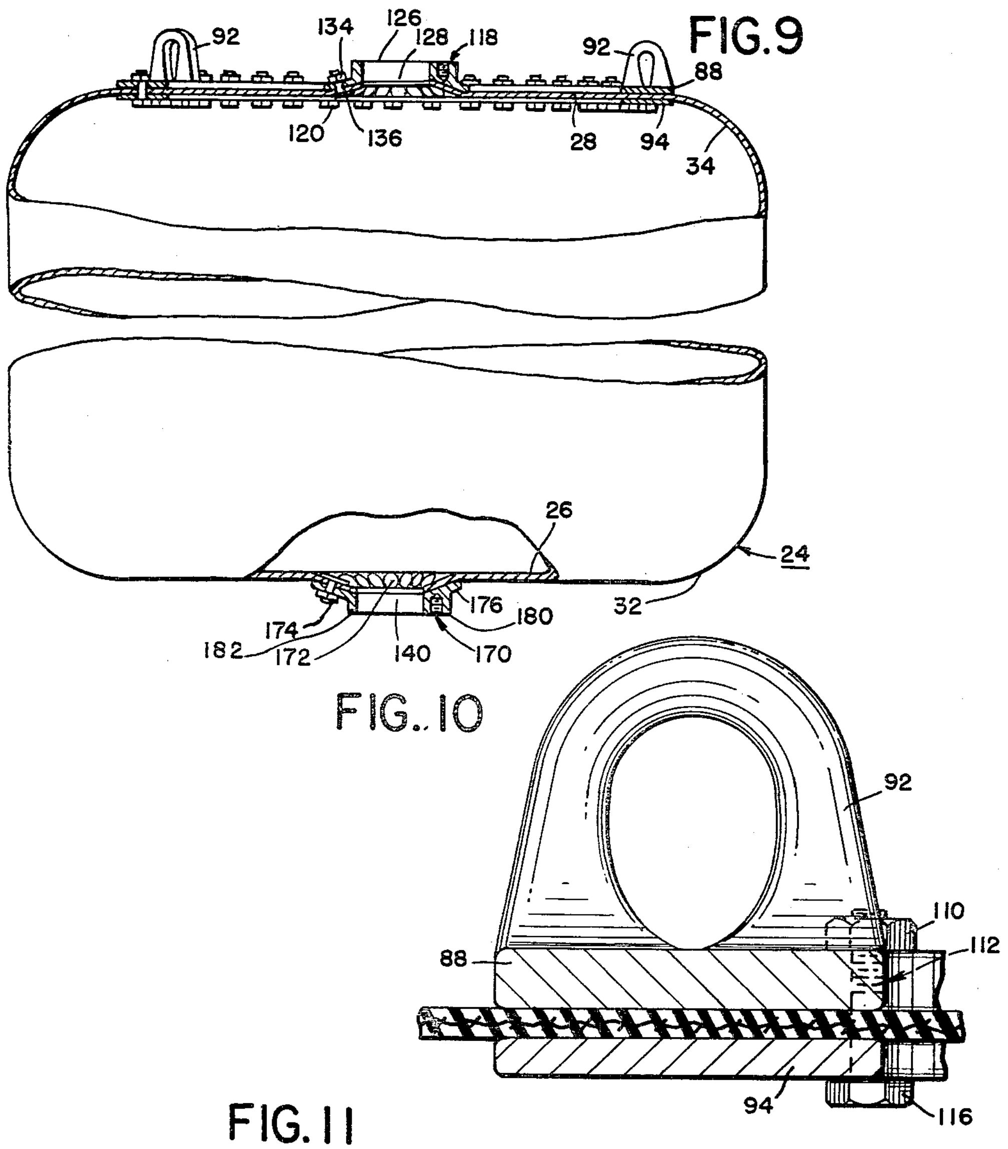
Fig. 9 is a front elevation of the container, partially in section.
Fig. 10 is an enlarged sectional view taken along a radial plane to shown the attachment of the container support ring to the container.

The fitting for the lower end of the container, which is provided for the opening 140, is identical with the one just described for the upper end, see Fig. 9. Because of this, the cover plates for the lower and upper ends can be readily interchanged.

Figures 12, 13, 14:
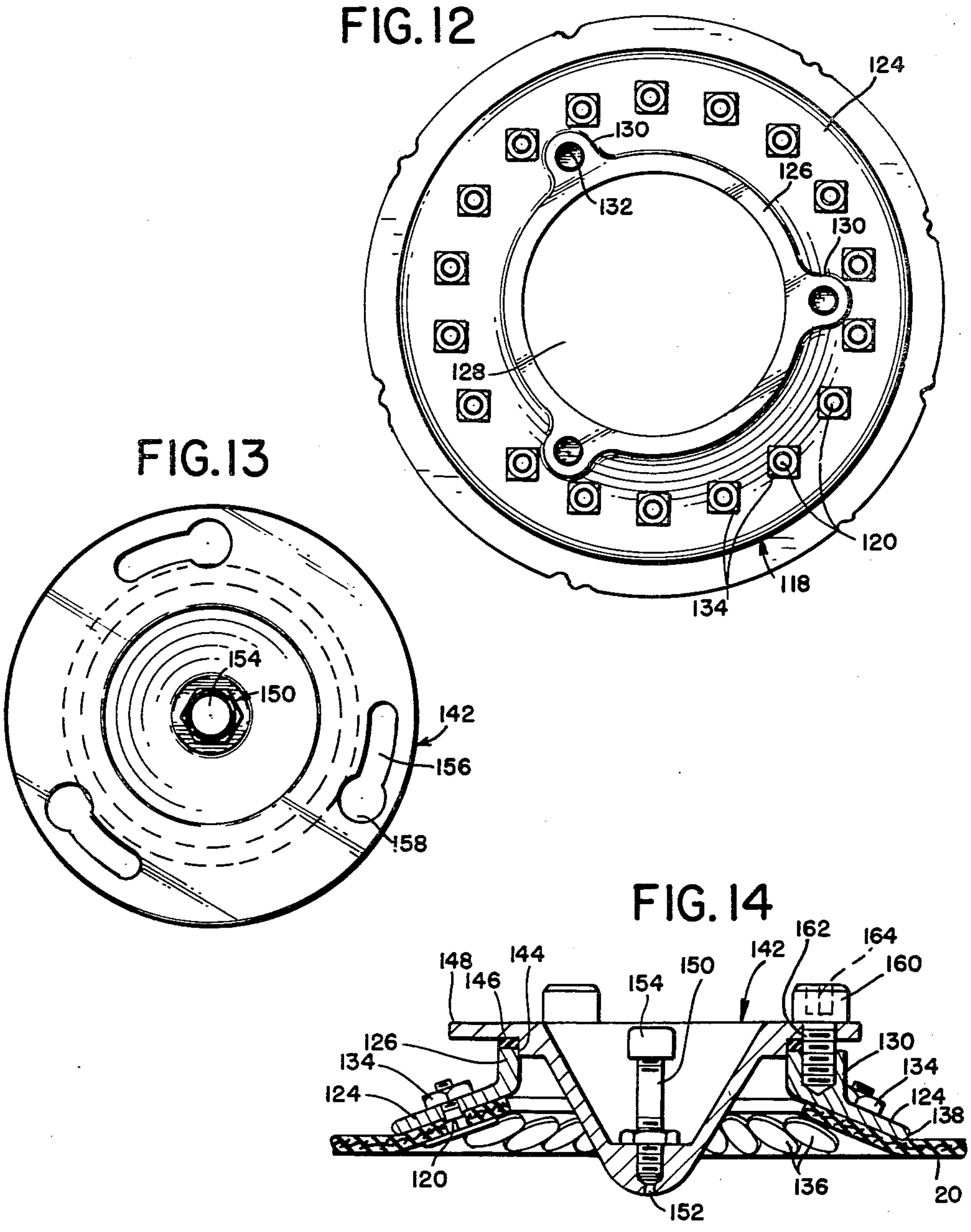
Fig. 12 is a plan view illustrating the cover fitting.
Fig. 13 is a plan view of the container cover for the upper end.
Fig. 14 is a sectional view of the container top taken along a diametral plane and illustrating the cover in closed position.

The cover plate 142 for the upper end is shown in Figs. 13 and 14. The cover has an annular shoulder 144 which fits just inside the collar 126 of the cover fitting. Just outside the shoulder is a circular gasket ring 146 which is positioned between the upper face of the collar and the lower face of the annular flange 148 when the cover is seated over the container opening, as is shown in Fig. 14.

The central portion of the cover is recessed, extending downwardly into the container, and a valve stem 150 is threaded into a hole in the center of the recessed portion. The valve stem 150, being positioned within the recess, cannot be damaged by any objects which may come in violent contact with the cover. A passageway 152 extends from the valve stem through the center of the cover into the container so that the container may be inflated through the valve.

The valve 150 is the conventional type check valve which has a removable valve stem threaded into the inside and has a cap 154 screwed to the top. The valve stem may be removed for withdrawing air from the container or for cleaning the stem to prevent contamination of the container contents.

When the container is filled with material, air may be inflated into the container through the valve to round out the depressions in the container surface to enhance the appearance of the container and to eliminate depressions in the top end in which water and foreign materials might gather. If the material within the container is a foodstuff, such as flour, an inert gas may be inflated into the container to prevent the entrance and growth of insects and other infestations.

The valve may also be used for emptying the container by air pressure. To accomplish this, the cover plate on the lower end is removed and pressure is introduced through the valve into the area above the contents to force the contents out the bottom. This is generally done while supporting the container by the supporting ring with the container suspended, so that the lower discharge opening is over a receiving bin.

Another use of the valve is for collapsing the container. This is done by removing the valve stem and evacuating the air from the barrel to cause a complete collapse. With the container flattened, a conservation of space is accomplished and many containers may be placed in a small area, as is illustrated in Fig. 17.

For purposes of securing the cover to the top of the container, the cover is provided with bayonet type arcuate slots 156 each having an enlarged eye 158 at one end through which pass the heads 160 of bolts 162, threaded into the holes 132 in the bosses 130 on the cover fitting. To close the container the cover is dropped over the cover fitting with the bolt heads passing through the eyes and the cover is rotated so that the bolt heads will be over the elongated arcuate slots 156. The bolt heads are then tightened to secure the cover in place. This is done by inserting a wrench into the recessed socket 164 in the bolt head.

The cover plate 166 at the lower discharge end of the container is shown attached in Fig. 16. The lower or discharge opening cover is similar to the cover at the upper end except that it has no recessed central portion and no valve. The cover 166 is formed substantially of a flat circular plate having three arcuate bayonet slots with enlarged eyes at one end and a gasket between the cover fitting 170 and the cover.

The cover fitting 170 at the lower end has the same construction and is attached in a similar manner to the cover fitting at the upper end. As shown in Figs. 9, 15 and 16, the cover fitting 170 at the disclosed end is positioned over the opening 140 in the barrel 24 and flat headed bolts 172 are inserted outwardly through the holes in the cover fitting. Nuts 174 are threaded to the bolts and the nuts tightened to draw the rubber material tightly against the flange 176 of the cover fitting. As with the top cover fitting, cover securing bolts 178 are threaded into bosses 180 in the collar 182 of the fitting. The cover is attached by slipping the eyes over the heads of the bolts 178 and giving the cover a twist to move the bolts into the narrower arcuate slots of the cover. The bolts are then tightened to secure the cover in place and seal the container opening.

The metal cover and other fittings which contact the contents of the container are preferably formed of or coated with an inert metal which will not corrode or contaminate the contents. The container is shown being filled in Fig. 15. Chains have been looped and secured through the eyes 92 on the supporting ring. These chains are suitably supported from above by mechanism, such as a hoist which is not shown, and furnish the sole support for the container.

A filling device, which is shown for purposes of illustration only, has a funnel 184, the lower end of which is projected into the container through the opening 102. A feed spout 186 supplies material to the funnel. When filling granular or powdered material 84, such as flour, it must be dispersed so that it will not form a pile in the center of the container, leaving the sides vacant. To level the material and get it out to the sides of the container, a distributor or spinner 188 is provided. The spinner has fingers 190 loosely hung from the lower end of the shaft 192 which swing outwardly from the centrifugal force. When the shaft 192 is revolved, the flour passing down through the opening of the container is struck by the rotating fingers 190 and is thrown to the sides of the container in a path indicated by the broken line arrows of Fig. 15. A motor 194, driving through a suitable gear reduction, rotates the shaft 192.

When the container has been filled, the filling apparatus is removed and the upper cover 142 replaced. The barrel may then be inflated such as with several pounds of air through the valve stem 150.

As is shown in Fig. 16, the chains 86, being attached to each of the eyes 92 on the supporting ring 88, form a tripod-shaped support which securely supports the container in a vertical position. The supporting ring 88 supports the entire load, evenly distributing the stress over a large area of container material. The stress is transmitted through the rounded shoulders down to the side walls and the container retains its normal shape. In this manner the container may be readily transported from place to place and set down upon its base when not in use. The barrel being formed of flexible material will permit the cover and fitting at the lower end to push up into the material as it is rested on its base.

For opening the container, the lower cover is removed by loosening the bolts 178 and giving the cover plate 166 a rotational twist in a counterclockwise direction. The cover will then fall off and the contents, if free flowing, will begin to empty from the container. With material which is slightly packed, it may be necessary to strike the side of the container to cause the material to begin flowing. Inflating air through the valve at the top cover end will pneumatically force the contents from the container. In the complete operation from filling, transporting and emptying, the container is neatly and securely supported by its annular ring at the top. The chains which are attached to the container by the eyelets 92 on the supporting ring may be quickly and easily detached from one container and attached to another and may be provided with hooks for this purpose.

When the container has been completely emptied, the lower cover may be replaced and the air sucked from the barrel interior. When the air is evacuated and the barrel flattened, it may be readily folded and stacked with other similar barrels 198 in the manner shown in Fig. 17. It will be noted in Fig. 17 that the ends of the container, when folded, substantially maintain their circular shape and the supporting ring 88 and the covers and fittings in no way interfere with the folding or stacking.

Thus we have provided a flexible container which has strength sufficient to enclose huge quantities of material. We have by the teachings of our invention provided fittings which permit rapid and easy handling of these very large flexible containers without danger of tearing the container material. The lifting device, in the form of an annular lifting ring, does not alter the shape of the container nor detract from its functionality. The ring conforms to the contour of the surface of the container and permits the container to be readily stacked after being flattened. A unique method has been provided for attaching the annular lifting ring by placing a split similar ring within the container, enabling the attachment of the ring after the container is manufactured by inserting the ring in sections through the small container opening.

In addition to the fittings which permit safe handling of a large container, cover fittings are provided which are small in size but which function to provide a secure closure for the container. The covers are interchangeable and provide a common means for pneumatically emptying the container, for inflating the container or for withdrawing the air to collapse the container.

We have, in the drawings and specification, presented a detailed disclosure of the preferred embodiment of our invention, but it is to be understood that as the invention is susceptible of modifications, structural changes and various applications of use within the spirit and scope of the invention, we do not intend to limit the invention to the specific form disclosed but intend to cover all modifications, changes and alternative constructions and methods falling within the scope of the principles taught by our invention.

We claim as our invention:

1. A container assembly comprising in combination a container formed of flexible material and having side and end walls, one end wall being provided with an opening for yielding access to the contents, a continuous beam extending adjacent the location of the joining of the side and end walls, a backing member having the same shape as said beam but being divided into sections for insertion into the interior of the container through said opening, securing members extending through said backing member, container material and beam member to secure the beam member to the container, and attaching means on said beam member for securing a lifting hoist for transporting the container.

2. A container assembly comprising in combination a container having continuous side and end walls formed of a non-rigid material, one of said end walls being provided with an opening, a continuous supporting ring on the exterior surface of said end wall spaced from the opening, a backing ring within the container against the end wall opposite the supporting ring and being similarly shaped, means to hold the rings together clamping the container material therebetween to secure the supporting ring to the container, and means on the supporting ring to attach lifting means for transporting the container.

3. A container assembly comprising in combination a container formed of a flexible material and having an end wall with a centrally located opening, an annular supporting ring being positioned around the opening against the end wall of the container, arcuate shaped backing segments of substantially the same degree of curvature as said ring being positioned within the container on the inner face of the end wall in a position corresponding to said supporting ring, means extending between and through the supporting ring and the arcuate backing ring segments to secure them together with the container material between to form means for supporting the container without tearing the resilient material, and means on the joined rings for attaching a lifting device for transporting the container.

4. A container assembly comprising in combination a container formed of a non-rigid material and having an end wall with an opening, an annular ring attached to said end wall around the opening, attaching elements evenly spaced around said ring for securing a lifting hoist for transporting the container, a backing ring having the same shape as the lifting ring and positioned inside the container opposite said lifting ring, said backing ring being segmented with the separations between segments positioned midway between said attaching elements, and means securing together the annular ring and backing ring.

5. The method of cutting holes for attaching fittings to a container formed of pliable material impervious to air which comprises inflating the container with air so that the surface will become taut and the opposing walls will remain separated, cutting a hole in the material, plugging the hole to prevent escape of air and to keep the container inflated, cutting subsequent holes and closing each before the next is cut to keep the container inflated.

6. The method of forming a container having an opening and formed of pliable material with an annular supporting ring on the end around the opening and an annular backing ring on the inner face of the end with bolts extending through holes in the material to secure the two rings together, the method comprising inflating the container, successively cutting holes through the skin of the inflated container, plugging each hole with one of said bolts as it is cut to prevent the escape of air, and positioning said rings on the container and inserting the bolts through the rings and said container holes to secure the rings in position.

7. A flexible container assembly comprising a container formed of rubber with cords embedded therein having side walls and end walls, one end of the container having an opening to provide access into the interior, a cover fitting positioned over the opening and having a lower flange larger than the opening with the lower face of the flange tapered downwardly from the center opening toward its outer edge, the lower outer edge of the flange being rounded, flat headed bolts extending outwardly through holes arranged concentrically around the opening of the container with the bolt heads substantially flush with the interior of the container, the bolts being adapted to draw the container material around the opening upwardly against the tapered flange to secure the cover fitting to the container, bolts adjustably threaded into the cover fitting, and a cover plate having arcuate slots at the edge narrower than the bolt heads and having enlarged eyes at the ends for passage of the bolt heads when the cover is placed over the cover fitting, the cover being adapted to be secured by rotating and by tightening the bolts.

8. A container according to claim 7 wherein the container is provided with an opening, a cover fitting, and cover at the other end, the covers and fitting being the same size as at the first end so as to make the covers interchangeable.

9. A container assembly comprising in combination a container formed of flexible material having a tubular body portion and attached end walls, one of said end walls having an access opening near its center, a supporting beam having a continuous wall engaging portion extending around the end wall at an area spaced outwardly from said opening and adjacent the location where the end wall joins said body, a plurality of backing member sections adapted for insertion into the container through said opening to positions opposite said beam, securing means passing through the material and securing said backing member sections to said supporting beam with the material clamped therebetween, the number and shape of said backing member sections providing an area of clamping engagement substantially coextensive with the wall-engaging portion of said beam, and means on said beam for attaching a lifting device for transporting the container.

10. A container assembly comprising in combination a container formed of flexible material having a tubular body portion and attached end walls, one of said end walls having an access opening near its center, a supporting beam having a continuous wall engaging portion extending around the end wall at an area spaced outwardly from said opening and adjacent the location where the end wall joins said body, a backing member positioned inside said container opposite said wall-engaging portion and providing an area of clamping engagement substantially coextensive with said wall-engaging portion, securing means passing through the material and securing said backing member to said supporting beam with the material clamped between said backing member and wall-engaging portion, and means on said beam for attaching a lifting device for transporting the container.

References Cited in the file of this patent

UNITED STATES PATENTS

| | | |
|---|---|---|
| 1,118,451 | Sloper | Nov. 24, 1914 |
| 1,406,478 | Mote | Feb. 14, 1922 |
| 1,894,675 | Dixon | Jan. 17, 1933 |
| 2,222,083 | Lintz | Nov. 19, 1940 |
| 2,314,639 | West et al. | Mar. 23, 1943 |
| 2,392,288 | Marcy | Jan. 1, 1946 |
| 2,412,271 | Kercher | Dec. 10, 1946 |
| 2,416,132 | Watson | Feb. 18, 1947 |
| 2,559,064 | Cunningham | July 3, 1951 |
| 2,563,976 | Torosian | Aug. 19, 1951 |
| 2,565,313 | Lauck | Aug. 21, 1951 |
| 2,612,924 | Cunningham | Oct. 7, 1952 |